(No Model.)

J. E. WINDLE.
FRICTION CLUTCH.

No. 451,238. Patented Apr. 28, 1891.

Witnesses.
Fred S. Greenleaf
Frederick L. Emery

Inventor.
John E. Windle,
by Crosby & Gregory

UNITED STATES PATENT OFFICE.

JOHN E. WINDLE, OF NORTH GRAFTON, MASSACHUSETTS.

FRICTION-CLUTCH.

SPECIFICATION forming part of Letters Patent No. 451,238, dated April 28, 1891.

Application filed August 23, 1890. Serial No. 362,889. (No model.)

*To all whom it may concern:*

Be it known that I, JOHN E. WINDLE, of North Grafton, county of Worcester, State of Massachusetts, have invented an Improvement in Friction Clutch or Coupling Mechanism for Shafts, Pulleys, &c., of which the following description, in connection with the accompanying drawings, is a specification, like letters on the drawings representing like parts.

This invention relates to a clutch mechanism for operating the frictional bearings or intermittingly-contacting surfaces of friction clutches or couplings, the object being to obtain a simple, strong, and ready movement for connecting and disconnecting the driving and driven parts, so that a shaft or pulley may be put in motion quickly and gently, yet positively, or be readily stopped, as desired.

My mechanism includes as essential elements an expansible ring, one or more connected vibratory bars having cogged or toothed surfaces arranged eccentrically to the pivotal points or axes of the bar or bars, and an operating-gear and means to move it and move the bar or bars to effect the expansion or contraction of the said ring, so that it may become engaged with or disengaged from the co-operating part with which the frictional connection is to be made.

The details and mode of operation of my invention will be more fully apparent from the following description and accompanying drawings, in which—

Figure 2:
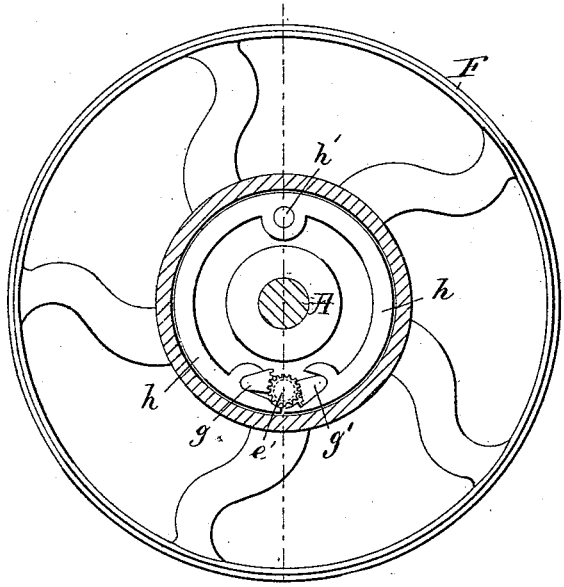
Figure 1:
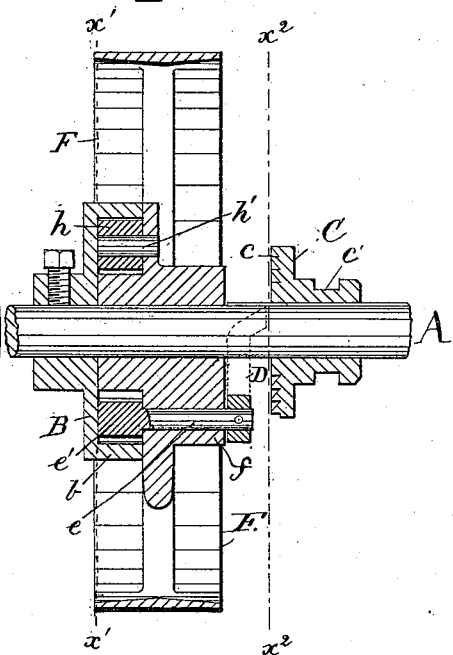
Figure 3:
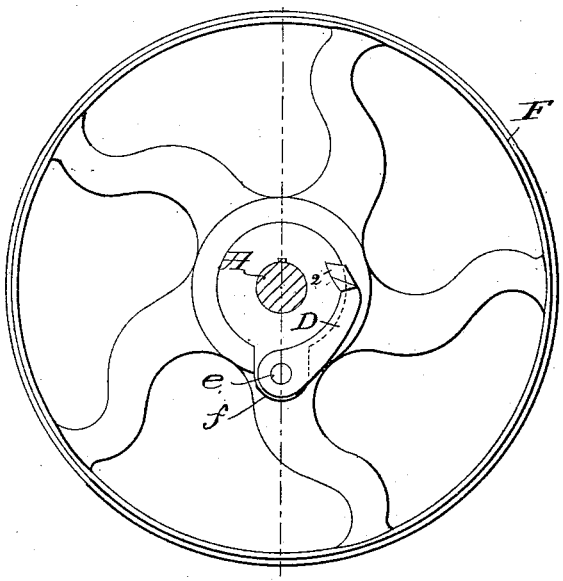
Figure 4:
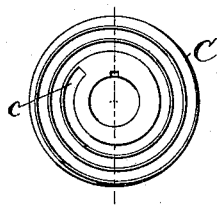

Figure 1 represents a cross-section of a pulley or band-wheel with a friction-clutch attachment embodying my invention. Fig. 2 is a section in line $x'$ of Fig. 1, looking to the right of same. Fig. 3 is a section in line $x^2$ of Fig. 1, looking to the left of said line; and Fig. 4 is a section at the right of said line $x^2$.

A represents a shaft, upon which is placed a pulley so fitted that one may revolve freely without the other, except when connected rigidly by engagement of the clutch.

B is a permanently-fixed plate or flange, having a cylindrical rim $b$, which forms one of the frictional surfaces of the clutch.

The shaft A has a sliding actuating-piece connected to it by a feather, so as to be slid or moved lodgitudinally therein by any usual hand-lever or shipper connection, (not shown,) it being made to enter or engage the circumferential groove $c'$ in the hub or sleeve of the actuating-piece. The actuating-piece has a scroll or involute thread $c$ (see Fig. 3) upon the inner face, which, when said piece is moved to the left in Fig. 1, engages a projecting toe or point 2 of a vibrating arm or lever D, connected with a rod or shaft $e$, journaled in a boss $f$ of the hub of the pulley F. The shaft $e$ carries a gear $e'$, the teeth of which engage with the eccentric cogged or toothed ends of one or more vibratory bars $g$ $g'$, pivoted at the end or ends of the expansible ring $h$, the ring being pivoted or connected to the pulley F by the stud or dowel $h'$. The periphery of the ring $h$ forms a suitable surface for frictional engagement with the interior of the rim $b$, and in its unexpanded condition the external diameter of the ring is enough smaller than the internal diameter of the ring $b$ to allow free and independent movement of the one independently of the other.

When the parts are to be coupled together to act frictionally for transmitting motion, the actuating-piece C is made to contact with the lever D, and so long as there is a difference in their rotary movement the scroll $c$ will act upon the lever D and cause sufficient rotation or movement of gear $e'$ and the one or more vibratory bars $g$ $g'$ to bring them to a position where their increased radial length will expand the ring $h$ sufficiently to completely fill and bind the rim $b$, thereby making a positive engagement which will impart motion from one to the other until the actuating part C shall be withdrawn from its engagement with the lever D, when the frictional surfaces of $b$ and $h$ will be released and will not be moved together.

Instead of the involute thread $c$ on the actuating part C, a simple conical sleeve may be used to act upon the lever D, the only advantage of the scroll or involute thread being that it has a greater range of action than the conical form.

The ring constitutes an expanding device, on which is pivoted the arms having a toothed surface eccentric to the part of the arms.

This invention is not limited to the exact shape of the expanding portion of the clutch on which the said arms are pivoted.

The rim $b$ constitutes a cylindrical projection to co-operate with the expanding device, and this invention is not limited to the exact shape or location of the projection $b$ with relation to the pulley.

Having thus described the construction and action of my improved clutch mechanism, I claim as my invention and desire to secure by Letters Patent—

1. The combination, with a shaft, a plate fixed thereon and having a cylindrical flange, and an expanding device to co-operate with said flange, of one or more vibratory bars pivoted to said expanding device and toothed eccentrically with relation to their pivots, and an operating-gear to vibrate said bar or bars to thereby control the frictional engagement between said expanding device and flange, substantially as described.

2. In a friction clutch or coupling, a cylindrically-flanged plate, an expansible ring adapted to co-operate therewith, and eccentrically-toothed bars pivoted to the ends of said ring, combined with a vibratory lever operatively connected to said bars and an actuating-piece having an involute or scroll-thread thereon to engage and move said vibrating lever, substantially as shown and described.

In testimony whereof I have signed my name to this specification in the presence of two subscribing witnesses.

JOHN E. WINDLE.

Witnesses:
GEO. W. GREGORY,
EDITH F. GUILD.